United States Patent
McQuillis et al.

(10) Patent No.: US 8,105,415 B2
(45) Date of Patent: Jan. 31, 2012

(54) LOW COST MAKING OF A LOW CARBON, LOW SULFUR, AND LOW NITROGEN STEEL USING CONVENTIONAL STEELMAKING EQUIPMENT

(75) Inventors: Gary McQuillis, Blytheville, AR (US); Jerome Jenkins, Blytheville, AR (US); Neal Ross, Blytheville, AR (US); Dhiren Panda, Blytheville, AR (US); David John Sosinsky, Carmel, IN (US)

(73) Assignee: Nucor Corporation, Charlotte, NC (US)

( * ) Notice: Subject to any disclaimer, the term of this patent is extended or adjusted under 35 U.S.C. 154(b) by 0 days.

(21) Appl. No.: 12/818,619

(22) Filed: Jun. 18, 2010

(65) Prior Publication Data

US 2010/0276102 A1    Nov. 4, 2010

Related U.S. Application Data

(63) Continuation-in-part of application No. 12/414,047, filed on Mar. 30, 2009.

(60) Provisional application No. 61/086,141, filed on Aug. 4, 2008.

(51) Int. Cl.
*C21C 7/06* (2006.01)
*C21C 7/064* (2006.01)
*C21C 7/068* (2006.01)
*C21C 7/076* (2006.01)
*C21C 7/10* (2006.01)

(52) U.S. Cl. ............................................ 75/508; 75/560
(58) Field of Classification Search .................... 75/508, 75/560

See application file for complete search history.

(56) References Cited

U.S. PATENT DOCUMENTS 5,252,120 A * 10/1993 Finkl et al. ....................... 75/508
7,998,237 B2 * 8/2011 Pleschiutschnigg et al. 75/10.46

* cited by examiner

*Primary Examiner* — George Wyszomierski
*Assistant Examiner* — Tima M McGuthry Banks
(74) *Attorney, Agent, or Firm* — Hahn Loeser & Parks LLP (57) ABSTRACT

A method of making a steel with low carbon less than 0.035% by weight including steps of preparing a heat of molten steel composition in a steelmaking furnace to a tapping temperature as desired for desulfurization at a VTD, tapping open into a ladle the molten steel composition with an oxygen level between about 600 and 1120 ppm, providing slag forming compound to the ladle to form a slag cover over the molten steel composition in the ladle, transporting the molten steel to a VTD, decarburizing the molten steel composition at the VTD by drawing a vacuum of less than 650 millibars, after decarburizing, transporting the molten steel to an LMF and deoxidizing the molten steel composition, after deoxidizing, returning to the VTD to desulfurize and degas the molten steel composition, and casting the molten steel composition to form a steel with low carbon less than 0.035% by weight.

18 Claims, 8 Drawing Sheets

Electric Arc Furnace → Vacuum Tank Degasser → Ladle Metallurgy Furnace

LOW COST MAKING OF A LOW CARBON, LOW SULFUR, AND LOW NITROGEN STEEL USING CONVENTIONAL STEELMAKING EQUIPMENT

This application is a continuation in part of U.S. patent application Ser. No. 12/414,047, filed on Mar. 30, 2009, which claims the benefit of U.S. Provisional Patent Application No. 61/086,141, filed on Aug. 4, 2008. U.S. patent application Ser. No. 12/414,047 is incorporated herein by reference.

BACKGROUND AND SUMMARY

Certain commercial steel compositions require relatively low amounts of carbon (less than 0.035%), nitrogen (less than 50 ppm), and sulfur (less than 30 ppm). In the past, methods of producing these low carbon and low sulfur steels used a combination of processes in a steelmaking furnace and a degasser. The prior method involved reducing the carbon levels in the steel composition in the steelmaking furnace, such as an electric arc furnace (EAF), making alloy additions during the tapping process to desulfurize and alloy the steel, and then shipping the steel to the degasser, such as a vacuum tank degasser (VTD). This processing route was simple and quite straightforward.

To achieve the steel composition requirements of such commercial grades in the past, steel with very low carbon levels, such as less than 0.025%, was tapped at the steelmaking furnace. The dissolved oxygen levels associated with these low carbon amounts were in the order of 1200 ppm to 1400 ppm in the furnace before tapping. Where the degasser was a distance from the furnace, the steel was tapped at approximately 1700° C. to compensate for temperature losses during transportation to the degasser. During the tapping process, the steel was deoxidized with aluminum and ferrosilicon (FeSi). Lime and aluminum dross were also added to create a fluid, deoxidized, desulfurizing slag. By these additions, the desulfurizing reaction was started in the ladle during shipping to the degasser. At the degasser further additions of aluminum, lime, calcium aluminate and dolomitic lime were made to ensure desired sulfur removal during the degassing cycle. While aluminum is used as the primary deoxidant, these steel compositions are commercially considered to be silicon-killed steels.

The prior process had drawbacks, including high refractory wear on the steelmaking furnace. The elevated tapping temperatures and high oxygen content required before tapping the steelmaking furnace had an adverse effect on productivity at the furnaces. The high temperatures and high oxygen conditions enabled high amounts of FeO in the slag at the high temperatures, causing excessive refractory wear on the furnace walls. This led to increased furnace down-times while the furnace refractories were patched with gunite. Also the high FeO content in the slag results in lower efficiency in steelmaking as more iron units are lost in the slag.

The prior process also required the use of low carbon alloys and additives throughout the subsequent processes from the steelmaking furnace to maintain the low carbon level below 0.035% by weight. Low carbon alloying elements, such as low carbon FeMn, were required to provide desired elements without upsetting the final carbon content of the steel. Recently, the price of low carbon ferro-alloys has increased significantly, making this method economically undesirable to produce such low carbon steel. Further, lowering the amount of carbon in the steel composition in the steelmaking furnace required additional decarburization time, which also adversely affected productivity at the steelmaking furnace. Cost was further increased as a result of more silicon and aluminum required to deoxidize the steel composition as a result of the higher oxygen content. There remains a need to decrease production costs of low carbon, low nitrogen, and low sulfur steels.

We have found an alternative method of making a steel with low carbon less than 0.035% by weight that reduces the need for low carbon ferro-alloys, reduces wear on refractories, and increases steelmaking efficiency.

Disclosed is a method of making a steel with low carbon less than 0.035% by weight comprising the steps of:

(a) preparing a heat of molten steel composition in a steelmaking furnace to a tapping temperature as desired for decarburizing at a vacuum tank degasser, (b) tapping open into a ladle the molten steel composition with an oxygen level between about 600 and 1120 ppm, (c) providing slag forming compound to the ladle to form a slag cover over the molten steel composition in the ladle, (d) transporting the molten steel composition in the ladle to a vacuum tank degasser, (e) decarburizing the molten steel composition at the VTD by drawing a vacuum pressure less than 650 millibars, (f) after decarburizing, transporting the molten steel composition in the ladle to a ladle metallurgical furnace, (g) prior to or after the step of transporting the molten steel composition in the ladle to a ladle metallurgical furnace, adding one or more deoxidizers to the molten steel composition, (h) prior to or after the step of transporting the molten steel composition in the ladle to a ladle metallurgical furnace, adding one or more flux compounds to desulfurize the molten steel composition, (i) deoxidizing the molten steel composition in the ladle metallurgical furnace, (j) after deoxidizing, transporting the molten steel composition in the ladle to the vacuum tank degasser, (k) desulfurizing the molten steel composition in the VTD, and (j) casting the molten steel composition to form a steel with low carbon less than 0.035% by weight.

Prior to or after the step of transporting the molten steel composition in the ladle to a ladle metallurgical furnace, the method may include adding one or more ferroalloy compounds to the molten steel composition. After the step of deoxidizing the molten steel composition in the ladle metallurgical furnace, the method may include reheating the molten steel composition in the ladle. Alternatively or in addition, the method may include after desulfurization, drawing a vacuum between about 0.5 to 2.5 millibar for nitrogen removal.

Before casting, the decarburized and deoxidized molten steel composition may be transported to the LMF for at least one of addition of oxygen, further alloying, and reheating the molten steel. The decarburized and deoxidized molten steel composition may be reoxidized by adding free oxygen to molten steel composition to a level between 20 and 70 ppm and a total oxygen content of at least 70 ppm, and then casting the molten steel composition in a twin roll caster to form a steel strip with low carbon less than 0.035% by weight.

The amount of sulfur in the steel composition during the tapping step may be between about 0.02% and 0.09% by weight. The amount of carbon in the steel composition during the tapping step may be between about 0.02% and 0.05% by weight, and the amount of nitrogen in the steel composition may be less than about 0.008% by weight. Also, the step of preparing a heat of molten steel composition may be performed in an electric arc furnace.

The open tapping step may be carried out at a temperature between about 1600° C. and 1650° C., or a temperature between about 1650° C. and 1700° C., or a temperature between about 1700° C. and 1750° C.

The decarburizing step may be at a vacuum level of between 1 and 650 millibars, or between 350 and 550 millibars, or at or below 530 millibars.

Prior to decarburizing the step, the method of making a steel with low carbon less than 0.035% by weight may also include the steps of:

(i) measuring and recording at the vacuum tank degasser the amount of carbon in the steel composition, amount of oxygen in the steel composition, and the temperature of the steel composition, (ii) providing a process model correlating amounts of oxygen and carbon in steel composition with decarburization time to reach a desired amount of carbon in the steel composition; and (iii) determining by the process model a decarburization time based on the measured amounts of oxygen and carbon in the steel composition.

Alternatively or in addition, prior to decarburizing the step, the method of making a steel with low carbon less than 0.035% by weight may further comprise the steps of:

(i) measuring and recording at the vacuum tank degasser the amount of carbon in the steel composition, amount of oxygen in the steel composition, and the temperature of the steel composition, (ii) providing a process model correlating amounts of oxygen and carbon in steel composition with amounts of deoxidizing addition needed to deoxidize the steel composition and (iii) determining by the process model an amount of deoxidizing addition to the steel composition based on the measured amounts of oxygen and carbon in the steel composition.

The step of adding one or more flux compounds may involve adding one or more compounds selected from a group consisting of lime, aluminum, calcium aluminate, dolomitic lime, wollastonite, fluorspar, silica sand, ferrosilicon, ferrosilicomanganese, and a prefused synthetic flux.

Further, alternatively or in addition, prior to decarburizing the step, the method of making a steel with low carbon less than 0.035% by weight may further comprise the steps of:

(i) measuring and recording at the vacuum tank degasser the amount of carbon in the steel composition, amount of oxygen in the steel composition, and the temperature of the steel composition;

(ii) providing a process model correlating amounts of oxygen and carbon in steel composition with amounts of flux elements to desulfurize the steel composition, capable of selecting one or more flux elements based on the price of the flux elements; and (iii) determining by the process model a selection of flux elements and their amounts based on the measured amounts of oxygen and carbon in the steel composition.

DETAILED DESCRIPTION OF THE DISCLOSURE

Figure 1:
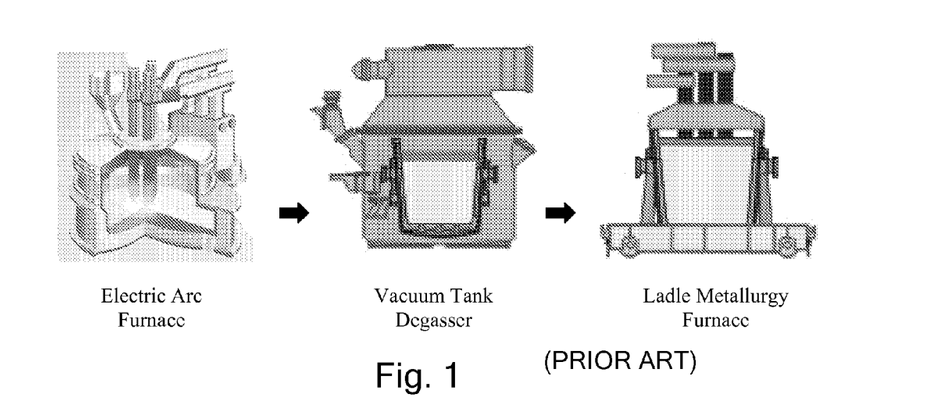
FIG. 1 is a diagrammatical flowchart of processes used to produce low carbon, low nitrogen and low sulfur steel.

The process for producing low carbon, nitrogen and sulfur steel grades is schematically shown in FIG. 1. In a process for preparing steel for casting, the steel may progress from an electric arc furnace (EAF) to a vacuum tank degasser (VTD) to a ladle metallurgical furnace (LMF) to a caster (not shown). In one alternative, the steel may progress from the electric arc furnace (EAF) to the vacuum tank degasser (VTD) to the ladle metallurgical furnace (LMF), then return to the VTD and LMF, and then continue to the caster (not shown). The steel grades produced by the presently disclosed method have low carbon less than about 0.035% by weight. The steel grade also typically has low nitrogen less than about 0.005% by weight and low sulfur less than about 0.003% or by weight less than about 0.0015% by weight.

A steel melt shop typically has one or more electric arc furnaces, such as a 120 ton (metric ton) EAF equipped with 110 megavolt-ampere (MVA) transformers. Such electric arc furnaces may be between about 30 ton and 400 ton capacity, but are generally for continuous casting between 60 and 120 tons capacity. Each furnace may contain gas injection lances, such as a Co-Jet™ brand three-lance gas injector system from Praxair, through which a combination of oxygen and natural gas can be blown into the furnace, as well as a carbon injection pipe. These may be used to inject carbon and oxygen at different ratios throughout the heating of the steel to create a foamy EAF slag. Preparation of a foamy slag has been described in Pretorius, E. B. and R. C. Carlisle, *Foamy Slag Fundamentals and Their Practical Application to Electric Furnace Steelmaking*, ISS-AIME, EF Conference Proceedings, 1998, pp. 275-291. The EAF may also be equipped with a top feed flux system through which lime, dolomite and carbon can be fed to control the slag basicity and viscosity for better slag foaming while melting. The present methods may be used with other steelmaking furnaces, such as a basic oxygen furnace.

The molten steel in the heat of an EAF is tapped open when the oxygen content and temperature of the steel composition are within desired parameter ranges. As the EAF may be removed from the VTD, the tapping temperature of the steel composition at the EAF is selected to allow for a temperature decrease during transit from the EAF to the VTD to provide a desired temperature at the VTD for decarburization and nitrogen and sulfur reduction. The steel composition may be tapped open from the furnace into a ladle through an eccentric bottom tap hole (EBT) system, which is typically designed to minimize carry-over slag from the EAF into the ladle during tapping. For example, in a 120 ton capacity EAF, about 105 ton of steel is tapped from the furnace into the ladle.

The ladles are typically equipped with two porous plugs capable of introducing argon into the steel composition as desired. The porous plug hook-up may use automated connections through corresponding ladle trunnions. The tap station is also equipped with a measurement system capable of measuring and recording the steel temperature directly after tapping, and may be capable of measuring and recording additional information such as oxygen level in the steel composition. As soon as the tapping process is completed, a slag sample may be taken from the EAF to measure the amount of FeO in the EAF slag.

In the present method, decarburization is not completed in the EAF as in the past processes. Instead, in the present method the EAF tap oxygen is lowered with correspondingly higher tap carbon levels. This improved method includes the steps of open tapping at the steelmaking furnace and a subsequent decarburization step at the VTD. Open tapping (or tapping open) means tapping without an intentional addition of deoxidizers. In the present method, the tap oxygen content of the steel is lowered to between about 600 and 1120 ppm, and more desirably between about 600 and 900 ppm. Alternatively, the tap oxygen content of the steel may be between about 400 and 900 ppm.

When the VTD is a distance from the steelmaking furnace, the tap temperature may be between about 1700° C. and 1750° C. to allow for a temperature decrease during transit from the furnace to the VTD. Alternatively, when the transit time to the VTD is less, the tap temperature may be between about 1600° C. and 1650° C., or alternatively between about 1650° C. and 1700° C. During the present tapping step, the argon plugs are shut off so that the steel composition may not be stirred. As soon as tapping from the furnace into the ladle is completed, a steel sample may be taken, and an addition of slag forming compound such as lime added to the ladle to cover the steel to reduce heat losses and oxidation during transportation to the VTD. A lid may desirably be placed onto the ladle before its transport to the VTD.

The present tapping step is in contrast to prior processes where lime, calcium aluminate, aluminum, slag deoxidant and ferrosilicon additions were made to the steel composition during tapping, and the steel composition in the ladle was stirred throughout the tapping process to mix the additions with the steel composition. In the present method, the steel composition is desirably not stirred during tapping. Additionally, other than an addition of lime to cover the steel in the ladle, no flux additions may be made during the present tapping step.

The past processes required tapping the steel composition from the EAF at very low carbon levels, such as less than 0.025% carbon, after which a partial desulfurization was done in the ladle after tap, and then desulfurization completed and hydrogen and nitrogen removed at the VTD. In the prior process, the average tap temperature was 1708° C. In addition, the average dissolved oxygen content (tap oxygen) was 1398 ppm in the EAF prior to tapping, which resulted in a average carbon content of 0.022% in the ladle. The average FeO content of the slag was 38.6% in the prior process. During the prior tapping process, FeSi, aluminum and lime additions were made to the ladle. Additionally, aluminum dross was added to the ladle to reduce the concentration of the reducible oxides, FeO and MnO from the carried-over EAF slag. The typical carry-over EAF slag was typically less than 500 kg.

In the present methods of making steel with low carbon less than 0.035% by weight, by contrast, the steel composition is tapped open at the furnace, without deoxidizing additions. As discussed below, the tapping open step reduces the ability for desulfurization in the ladle prior to the VTD. The prior processes involved a deoxidant addition to the ladle and stirring the metal and slag to provide some amount of desulfurization before the VTD. In the prior processes, the sulfur content of the steel composition was typically reduced from approximately 0.035% to 0.016% by weight in the ladle before the VTD step.

In a first present method, after the tapping step, the steel composition is transported in a ladle to the VTD for further treatment to reduce hydrogen and nitrogen content and desulfurize the steel composition is performed. The ladle may be transported by a vehicle or an overhead crane. Upon arrival at the VTD, the ladle may be moved via an overhead crane and placed in the VTD tank. Once in the VTD porous plug connections may be made, the plugs opened and argon introduced through the porous plugs in the steel composition in the ladle using argon gas at flow rates typically of less than 1 m$^3$/min. The flow of argon causes an initial stifling to break-up and liquefy the slag, and make the steel temperature more even through the ladle. When the slag becomes liquefied, the porous plugs are turned off, and measurements of the temperature and amount of oxygen, and optionally, amount of carbon, are recorded. Alternatively, measurements of the temperature, amount of oxygen, and amount of carbon may be taken prior to stifling. These measurements at the VTD and the measurements at the furnace recorded before and/or after tapping may be used to determine the alloy and flux additions to the steel composition, and used to determine the amount of time for the decarburization step at the VTD.

In the first present method of making steel with low carbon less than 0.035% by weight the decarburization step is performed at the VTD followed by a deoxidation step, a slag building step, a desulfurizing step, and a nitrogen removal step at the VTD. The overall time at the VTD station may be about 10 minutes longer than in prior processes due to decarburization. However, the increase in processing time at the VTD may not substantially affect the overall time of steel composition preparation.

The decarburization process may begin after the argon stirring is turned off and measurements of the temperature and amount of oxygen are recorded in the steel composition at the VTD. The lid is placed onto the ladle, and the tank evacuation begins. As a vacuum is drawn on the ladle, gases are removed from the steel composition in the ladle, including carbon monoxide (CO), hydrogen, and nitrogen. As the vapor pressure of CO is reduced above the steel composition, additional carbon and oxygen react to form CO, which is drawn from the steel composition. We have found that the reaction of carbon and oxygen provides sufficient stirring action and no argon stifling is required. Vacuum levels of less than 650 millibars are used during decarburization. The vacuum levels may be between about 1 millibar and 650 millibar during decarburization, and may be between 350 and 550 millibars or below 530 millibars.

After decarburization in the VTD, an aluminum addition is made to the steel composition for deoxidization. Desired combinations of lime, aluminum, calcium aluminate, dolomitic lime, ferrosilicomanganese (FeSiMn) and other fluxes are also added to form a desulfurizing slag. Additions are added to the steel composition in the ladle through a pressure equalization hopper at desired times in the process. The addition of aluminum under vacuum is reactive. Prior to adding aluminum, the vacuum level may be adjusted to between about 530 and 1000 millibar.

Decarburization times and desired additions for deoxidization of the steel composition and slag building are previously determined using a process model. The process model may be used to control slag chemistry at the VTD, because the decarburization and deoxidation steps in the VTD affect the slag chemistry.

The measurements taken of the steel composition and the slag composition at the VTD and the measurements of the steel composition recorded after tapping may be fed into the process model, or an Addition Model. The Addition Model is an algorithm that may be used to analyze the measurements, or input data, and compare the input data to desired values or predetermined values. Based on the a difference between the input data and the desired or predetermined values, the Addition Model algorithm may determine which alloys and fluxes are to be added to the steel composition and their amounts to facilitate the removal of nitrogen and sulfur to the desired levels.

The Addition Model may use an optical basicity concept to generate better slag composition in terms of sulfide capacity. The optical basicity concept has been described in Sosinsky, D. J. and Sommerville, I. D., *The Composition and Temperature Dependence of the Sulfide Capacity of Metallurgical Slags*, Met. Trans. B, vol. 17B, 1986, pp. 331-337. In addition, the Addition Model uses a low cost combination of alloy and flux additions to produce the desired composition. The Addition Model is capable of providing a fluid, basic slag and deoxidized steel composition with desired steel-slag mixing qualities.

In the present method, the Addition Model may use an algorithm based on empirical data correlating decarburization time with the amounts of oxygen and carbon in the steel composition after initial stifling at the VTD to determine a decarburization time. The Addition Model may use the amount of oxygen in the steel composition after initial stirring at the VTD to determine an amount of aluminum to add after decarburization. Based on amount of aluminum and amount of oxygen, the Addition Model projection desired flux additions to form a desulfurizing slag.

The Addition Model algorithm may provide the determined amounts to a controller capable of automatically adding the determined amount of selected alloys and fluxes to the steel composition. For example, the VTD may have four bins positioned for providing alloys and fluxes to the steel composition. The four bins may contain lime, aluminum, calcium aluminate and either dolomitic lime or ferrosilicomanganese (FeSiMn), depending on the desired steel composition and slag composition. The controller may be capable of activating independently each bin to provide a measured amount of selected alloy or flux additions corresponding to the determined amount to the steel composition. After the required alloy and flux additions are weighed, they are added to the steel composition in the ladle through a pressure equalization hopper at desired times in the process.

As the desired additions are fed from the hopper, the tank lid is placed into its operating position. The porous plugs are turned on and the tank evacuation begins. The total cycle time in the VTD may be approximately 35 minutes.

After decarburization and deoxidation, vacuum levels of 1 to 2.5 millibar may be achieved for nitrogen removal. Alternatively or in addition, after desulfurization, vacuum levels of 1 to 2.5 millibar may be achieved for nitrogen removal. The pump down time to 1-2.5 millibar is typically less than 7 minutes, depending in part on the thermal history of the tank. The time to complete the desulfurization and nitrogen removal may be about 20 minutes.

Figure 2:
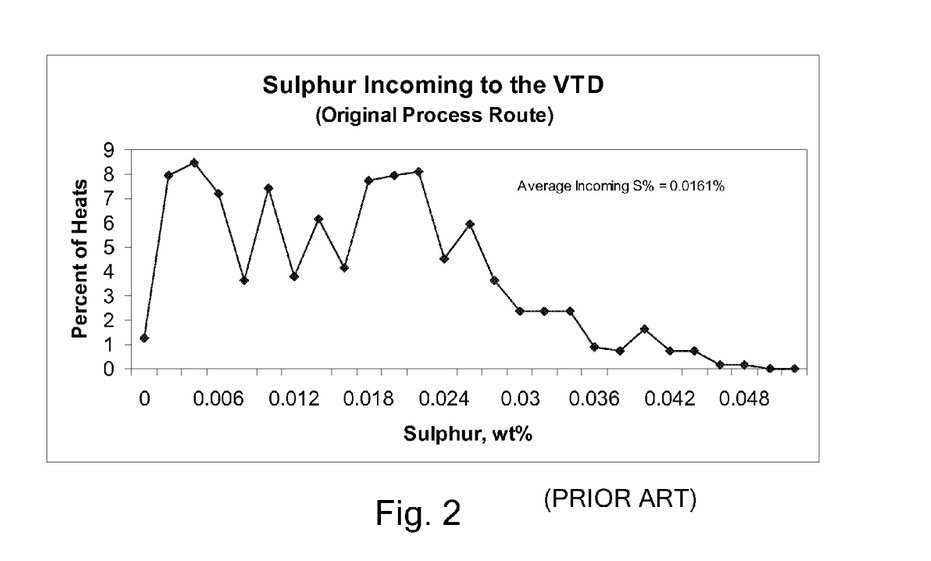
FIG. 2 is a graph of the sulfur content of heats entering the vacuum tank degasser using a prior process.

In the prior process, the Addition Model was programmed primarily for creating conditions capable of removing only sulfur and nitrogen. The prior process the steel composition had been partially deoxidized, in some heats to about 6.6 ppm, with high incoming ladle temperatures of about 1645° C. Since some desulfurization occurred after tap and during transport to the VTD, the distribution of the sulfur content in the incoming steel composition to the VTD was irregular. FIG. 2 shows distribution of the incoming sulfur to the vacuum tank degasser in the prior process. The average carbon, nitrogen and sulfur concentrations incoming to the VTD are tabulated in TABLE 1.

TABLE 1

Average carbon, nitrogen and sulfur concentrations incoming to the VTD for the prior process

| Element | Concentration, wt % |
| --- | --- |
| Carbon | 0.022 |
| Nitrogen | 0.0072 |
| Sulfur | 0.016 |

As shown in TABLE 1, in the prior process, the carbon concentration of the steel composition was within a desired range, such as less than 0.035% carbon, directly from the electric arc furnace. As discussed above, this required a selection of alloy and flux additions to the steel composition at the VTD that would not upset the low carbon amount in the steel composition.

TABLE 2

Average VTD incoming slag composition (wt %) for the prior process

| CaO | $SiO_2$ | $Al_2O_3$ | MgO | FeO + MnO |
| --- | --- | --- | --- | --- |
| 57.8 | 5.6 | 28.4 | 7.7 | 0.5 |

With the present method, oxygen in and temperature of the steel composition are measured at the VTD in the incoming steel composition and again measured after the VTD cycle. Slag and steel samples are also taken after the degas cycle for chemical analysis. The target carbon and sulfur content of the steel composition after degassing may be about 0.015% and about 0.0010%, respectively. The average carbon, nitrogen and sulfur concentrations of the steel composition incoming to the VTD in the first present method are shown in TABLE 3.

TABLE 3

Average carbon, nitrogen and sulfur concentrations
incoming to the VTD for the first present method

| Element | Concentration, wt % |
|---|---|
| Carbon | 0.035 |
| Nitrogen | 0.0069 |
| Sulfur | 0.036 |

Once the degassing cycle is completed the porous plugs are turned off, the VTD is returned to atmospheric pressure and the lid is opened. At this time the steel composition and slag composition are sampled and the temperature and oxygen of the steel composition are measured. The steel composition in the ladle is then transported via overhead crane to a Ladle Metallurgical Furnace (LMF) for further alloying and heating to the required casting temperatures as desired.

The present technique may also be used for preparing interstitial-free steel. The interstitial-free steel may have carbon levels below 0.01%, and may be below 0.005%.

In a second present method useful for a lime, silica, fluorspar slag system, after the open tapping step the steel composition is transported in the ladle to the VTD for decarburization. The ladle may be transported by a vehicle or an overhead crane. Upon arrival at the VTD, the ladle may be moved via an overhead crane and placed in the VTD tank. Once in the VTD porous plug connections may be made, the plugs opened and argon introduced through the porous plugs in the steel composition in the ladle using argon gas at flow rates typically of less than 1 $m^3$/min. The flow of argon causes an initial stirring to break-up and liquefy the slag, and make the steel temperature more even through the ladle. When the slag becomes liquefied, the porous plugs are turned off, and measurements of the temperature and amount of oxygen and amount of carbon are recorded. Alternatively, measurements of the temperature, amount of oxygen, and amount of carbon may be taken prior to stirring. These measurements at the VTD and the measurements at the furnace recorded before and/or after tapping may be used to determine the alloy and flux additions to the steel composition, and used to determine the amount of time for the decarburization step at the VTD.

In the second present method of making steel with low carbon, typically less than 0.035% by weight, the decarburization step is performed at the VTD, after which the steel composition will be removed from the VTD and treated in the LMF. For example, the overall time at the VTD station for decarburization may be about 10-12 minutes.

The decarburization process in the VTD may begin after the argon stirring is turned off and measurements of the temperature and amount of oxygen are recorded in the steel composition at the VTD. The lid is placed onto the ladle, and the tank evacuation begins. As a vacuum is drawn on the ladle, gases are removed from the steel composition in the ladle, which may include carbon monoxide (CO), hydrogen, and nitrogen. As the vapor pressure of CO is reduced above the steel composition, additional carbon and oxygen react to form CO, which is drawn from the steel composition. We have found that the reaction of carbon and oxygen provides sufficient stirring action and no argon stirring is required. Vacuum levels of less than 650 millibars are used during decarburization. The vacuum levels may be between about 1 millibar and 650 millibar during decarburization, and may be between 350 and 550 millibars or below 530 millibars. The target carbon content of the steel composition after decarburizing may be between about 0.005% and 0.010%.

After decarburization in the VTD, the VTD is returned to atmospheric pressure. The ladle is removed from the VTD and transported to the LMF for at least one of deoxidation of the composition, addition of alloying elements and/or compounds, building the slag, and reheating the steel. Prior to or after the step of transporting the molten steel composition in the ladle to a ladle metallurgical furnace, ferrosilicon (FeSi) and ferrosilicomanganese (FeSiMn) additions may be made to the steel composition for deoxidization. It is contemplated that in some alternatives, an aluminum addition may be made to the steel composition for deoxidization. Additionally, prior to or after the step of transporting the molten steel composition in the ladle to a ladle metallurgical furnace, desired combinations of lime, magnesium oxide, calcium aluminate, dolomitic lime, fluorspar, wollastonite, silica sand, ferrosilicon, ferrosilicomanganese, prefused synthetic flux, and other fluxes may be added to form a desulfurizing slag. Alternatively or in addition, commercial slag conditioners such as Deox 70 briquettes from Anker Industries, or other commercial preparations may be provided. The steel may be re-heated in the LMF to a temperature between about 1620° C. and 1680° C., or other temperature as desired. The target active oxygen content of the steel composition after the LMF step may be between 20 ppm and 40 ppm.

Decarburization time in the VTD and the desired additions in the LMF for deoxidization of the steel composition and slag building are previously determined using the Addition Model as discussed above. The Addition Model compares input data to desired values and determines which alloys and fluxes are to be added to the steel composition and their amounts to facilitate the removal of nitrogen and sulfur to the desired levels.

As discussed above, the Addition Model may use an optical basicity concept to generate better slag composition in terms of sulfide capacity, and may be used to determine a low cost combination of alloy and flux additions to produce the desired composition.

In the second present method, the Addition Model may use an algorithm based on empirical data correlating decarburization time with the amounts of oxygen and carbon in the steel composition after initial stirring at the VTD to determine a decarburization time. The Addition Model may use the amount of oxygen in the steel composition after initial stifling at the VTD to determine an amount of aluminum to add after decarburization. Based on amount of aluminum and amount of oxygen, the Addition Model projection desired flux additions to form a desulfurizing slag.

As discussed above, the Addition Model algorithm may provide the determined amounts to a controller capable of automatically adding the determined amount of selected alloys and fluxes to the steel composition. For example, the LMF may have bins positioned for providing alloys and fluxes to the steel composition. The bins may contain MgO, silica, wollastonite, fluorspar, or other fluxing agents and may contain ferrosilicon and ferrosilicomanganese alloying additions, depending on the desired steel composition and slag composition. The controller may be capable of activating independently each bin to provide a measured amount of selected alloy or flux additions corresponding to the determined amount to the steel composition. After the required alloy and flux additions are weighed, they are added to the steel composition in the ladle at desired times in the process.

After the slag is deoxidized in the LMF and the steel composition is at a desired temperature, the ladle is transported to the VTD for desulfurization and degassing. In the VTD, desulfurization and degassing may be achieved by drawing a vacuum pressure less than 10 millibar. For example, vacuum levels of 0.5 to 2.5 millibar may be achieved for nitrogen removal. Alternatively or in addition, after desulfurization, vacuum levels of 0.5 to 2.5 millibar may be achieved for nitrogen removal. The pump down time to 0.5-2.5 millibar is typically less than 7 minutes, depending in part on the thermal history of the tank. The time to complete the desulfurization and nitrogen removal may be between about 20 minutes and 35 minutes. Argon stirring may be provided through one or both plugs, and may use at least 750 scf total argon.

With the second present method, oxygen in and temperature of the steel composition are measured at the third step VTD in the incoming steel composition and again measured after the third step VTD cycle. Slag and steel samples are also taken after the degas cycle for chemical analysis. The target sulfur and nitrogen content of the steel composition after degassing may be about 10 ppm and less than about 45 ppm, respectively. The average manganese, silicon, carbon, and sulfur concentrations of the steel composition incoming to the third step VTD are shown in TABLE 4.

TABLE 4a

Average manganese, silicon, carbon, and sulfur concentrations incoming to the third step VTD for the second present method

| Element | Concentration, wt % |
|---|---|
| Manganese | 0.70% |
| Silicon | 0.24% |
| Carbon | 0.025% |
| Sulfur | 0.014% |

TABLE 4b

Typical ranges of manganese, silicon, carbon, and sulfur concentrations incoming to the third step VTD for the second present method

| Element | Concentration, wt % |
|---|---|
| Manganese | 0.30-0.80% |
| Silicon | 0.10-0.30% |
| Carbon | <0.035% |
| Sulfur | <0.025% |

Once the degassing cycle is completed the porous plugs are turned off, the VTD is returned to atmospheric pressure and the lid is opened. At this time the steel composition and slag composition are sampled and the temperature and oxygen of the steel composition are measured. The steel composition in the ladle is then returned to the LMF for at least one of addition of oxygen, further alloying, and heating to the required casting temperatures as desired. In the LMF, the steel may be reheated to between 1650° C. and 1700° C. At the LMF, oxygen and slag conditioners may be added to trim the steel composition as desired. The decarburized and deoxidized molten steel composition may be reoxidized before casting by adding free oxygen to the molten steel composition to a level between 20 and 70 ppm active oxygen and a total oxygen content of at least 70 ppm.

Figure 3A:
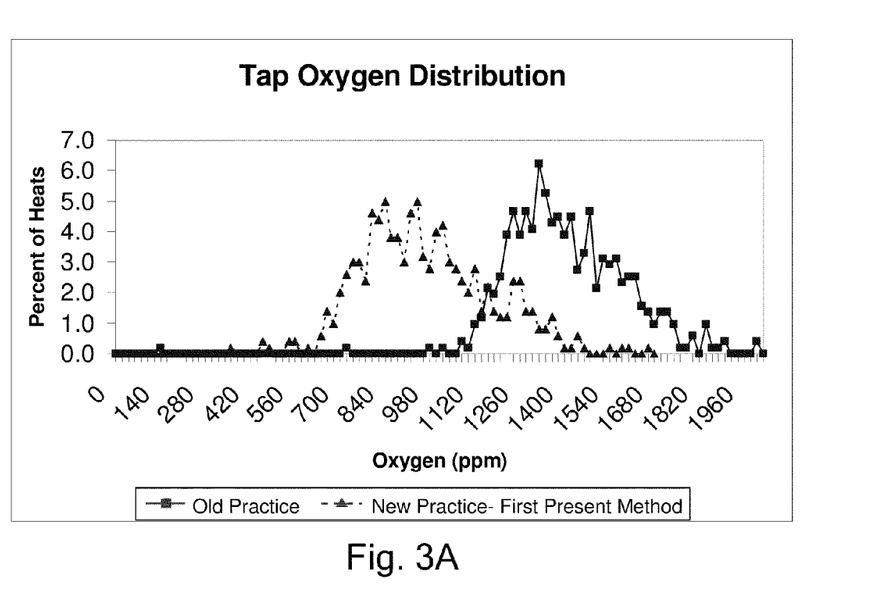
FIG. 3A is a graph of the oxygen distribution in steel at an electric arc furnace tapping process using the prior process compared to the first present method.
Figure 3B:
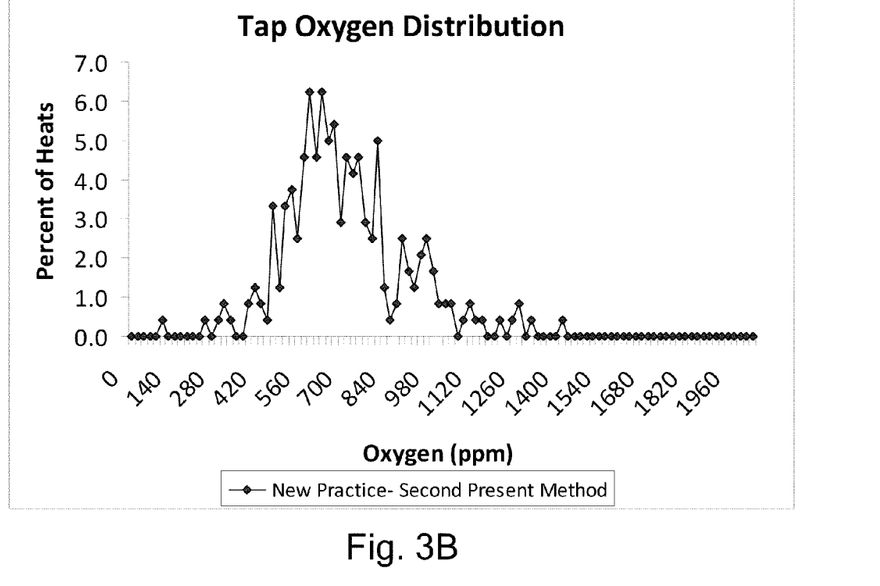
FIG. 3B is a graph of the oxygen distribution in steel at an electric arc furnace tapping process using the prior process compared to the second present method.

To determine the effectiveness of the present methods, prior data recorded from 500 heats prepared using the prior process was compared to data from a two month trial production of over 500 heats prepared using the presently disclosed methods. The data included measurements including amounts of oxygen, carbon, and sulfur in the steel composition at the tapping step, the temperature of the steel composition at the tapping step, and the amount of FeO in the EAF slag composition. A comparison of the tap oxygen content of the steel composition between the prior process and the presently disclosed methods is shown in FIGS. 3A and 3B. As shown in FIGS. 3A and 3B, the presently disclosed method provided a lower oxygen content than the prior process. The average tap oxygen decreased from 1398 ppm for the prior process compared to 962 ppm for the first present method and 694 ppm for the second present method.

Figure 4A:
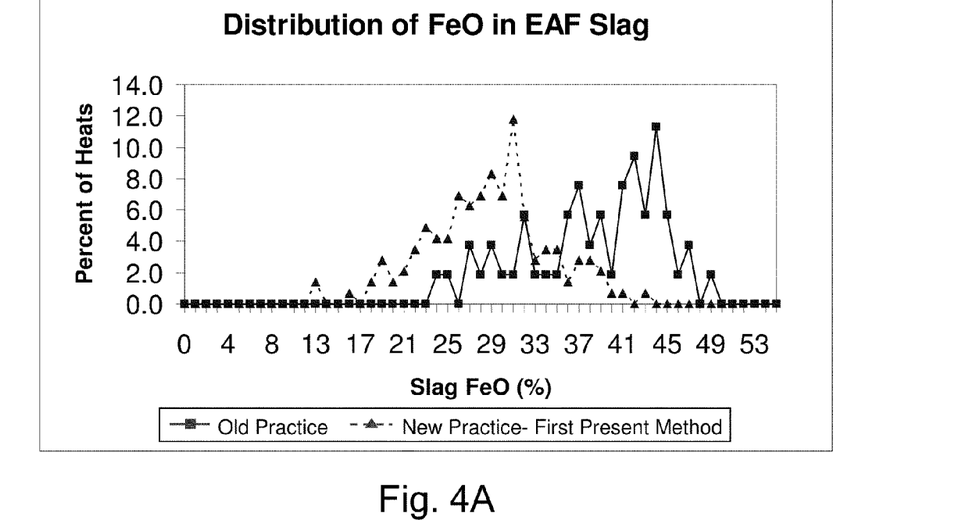
FIG. 4A is a graph of the distribution of FeO in slag in the electric arc furnace using the prior process compared to the first present method.
Figure 4B:
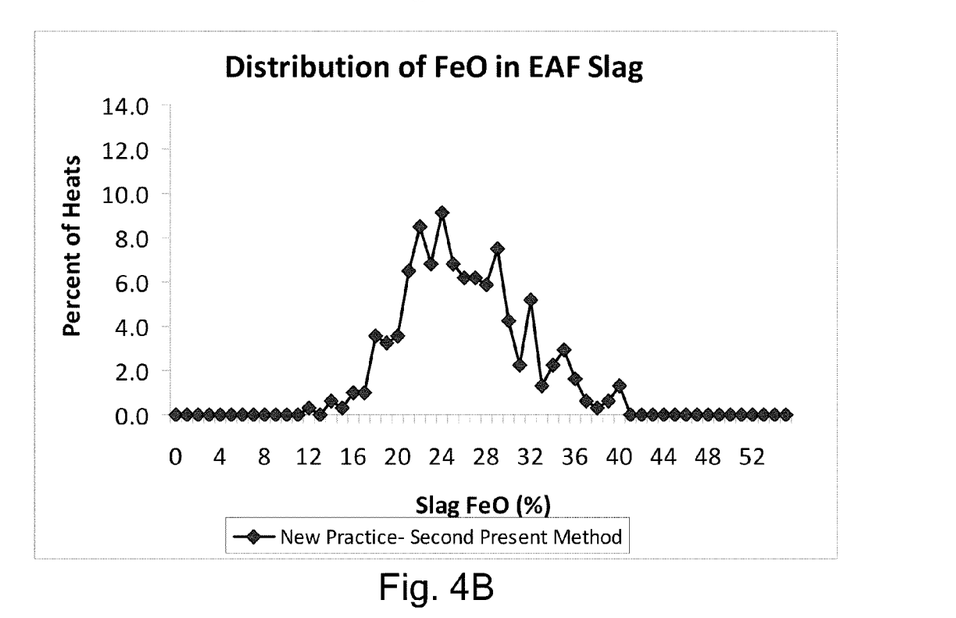
FIG. 4B is a graph of the distribution of FeO in slag in the electric arc furnace using the prior process compared to the second present method.

The effect of the lower tap oxygen content on the average FeO content of the furnace slag composition is shown in FIGS. 4A and 4B. The FeO content of the slag composition decreased from 38.6% using the prior practice to 27.7% using the first present method, and 25.9% using the second present method.

Figure 5A:
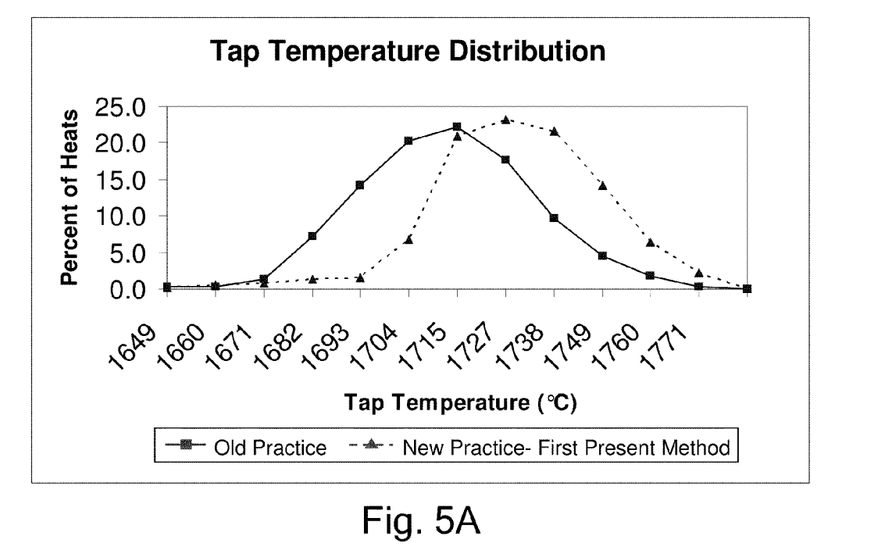
FIG. 5A is a graph of the distribution of steel temperatures during the electric arc furnace tapping process using the prior process compared to the first present method.
Figure 5B:
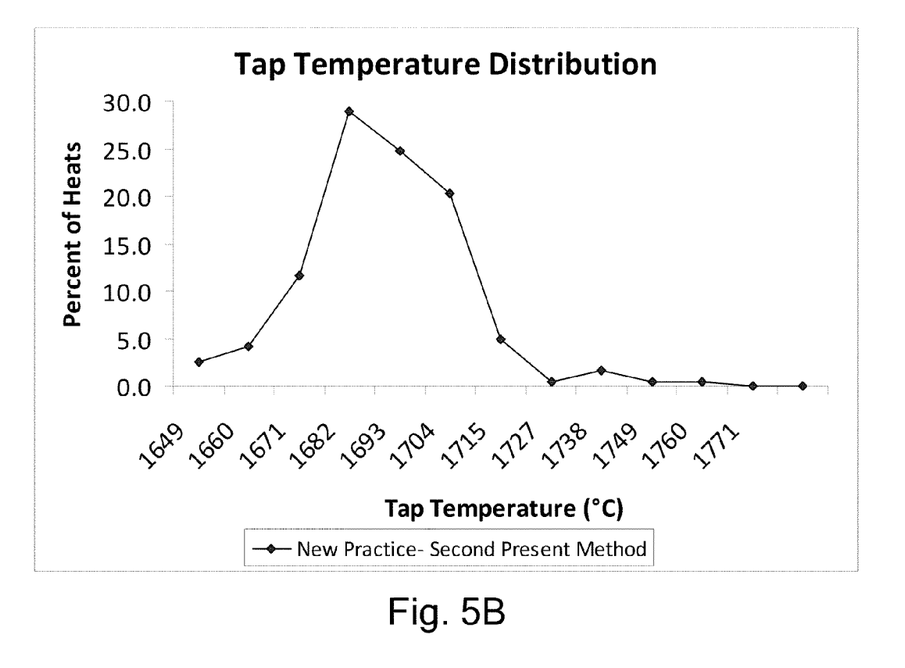
FIG. 5B is a graph of the distribution of steel temperatures during the electric arc furnace tapping process using the prior process compared to the second present method.

The tap temperature (prior process and first present method) is shown in FIG. 5A. As shown in FIG. 5A, the average tap temperature increased slightly, from 1708° C. to 1724° C. The additional decarburization step at the VTD required a slightly higher tap temperature to provide the same VTD exit temperatures However, in the second present process, as shown in FIG. 5B, the average tap temperature increased slightly, to about 1690° C. In the second present method, the molten steel may be reheated in the LMF, allowing lower tap temperatures.

Figure 6A:
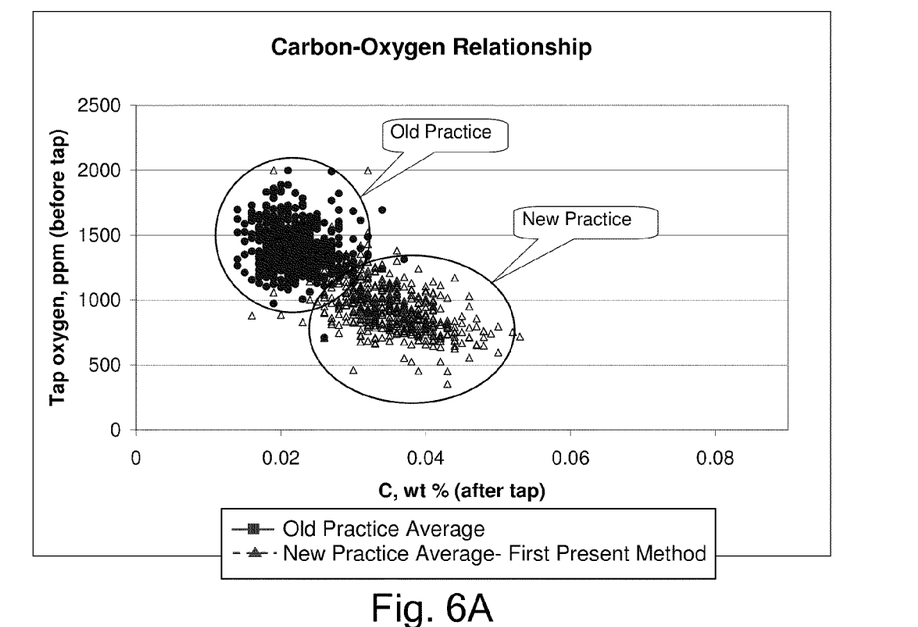
FIG. 6A is a graph of the amount of oxygen before the electric arc furnace tapping process compared to amount of carbon in the steel after tapping using the prior process and the first present method.

FIG. 6A shows the impact of lower tap oxygen levels on the carbon content of the steel composition in the first present method, as measured directly after tap from a sample taken from the ladle. As shown in FIG. 6A, the carbon content associated with the lowered tap oxygen content of the steel composition increased from 0.022% to 0.035%. This follows the reaction:

$$[C]+[O]=(CO)_{gas} \quad (1)$$

where [C], [O] and $(CO)_{gas}$ represent the dissolved carbon, dissolved oxygen and carbon monoxide gas, respectively. From reaction (1) it is shown that lower dissolved oxygen contents of the steel composition will result in higher dissolved carbon contents at constant partial CO pressure.

Figure 6B:
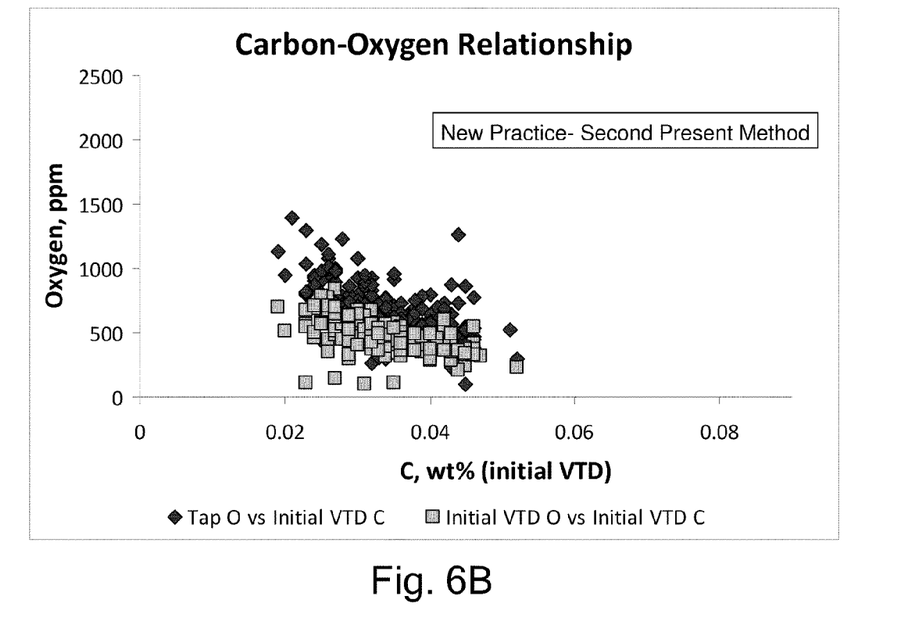
FIG. 6B is a graph of the amount of oxygen before the electric arc furnace tapping process compared to amount of carbon in the steel entering the vacuum tank degasser and the amount of oxygen in the steel entering the vacuum tank degasser compared to the amount of carbon entering the vacuum tank degasser the second present method.

The carbon oxygen relationship for the second present method is shown in FIG. 6B. FIG. 6B shows two relationships: the oxygen level in the ladle at tap is compared to the initial VTD carbon level prior to stirring. Additionally, the initial VTD oxygen level is compared to the initial VTD carbon level. It is contemplated that the initial VTD carbon measurement is lower than if measured after tap because the time in transferring the ladle from the EAF to the VTD results in some natural decarburization. Additionally, FIG. 6B shows that the oxygen levels measured after tap are slightly higher than the initial VTD oxygen level measurement, due in part to the decarburization and formation of FeO during the time in transferring the ladle from the EAF to the VTD.

Figure 7A:
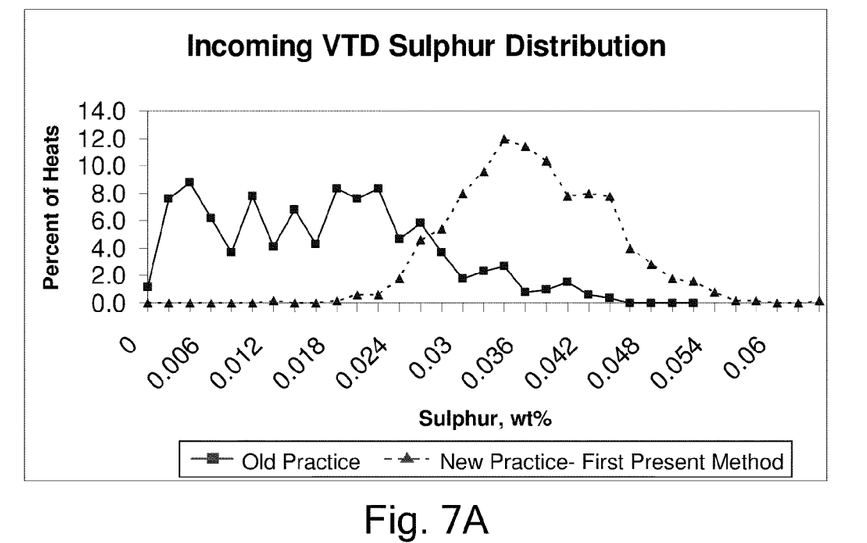
FIG. 7A is a graph of the sulfur content of heats entering the vacuum tank degasser using the prior process compared to the first present method.
Figure 7B:
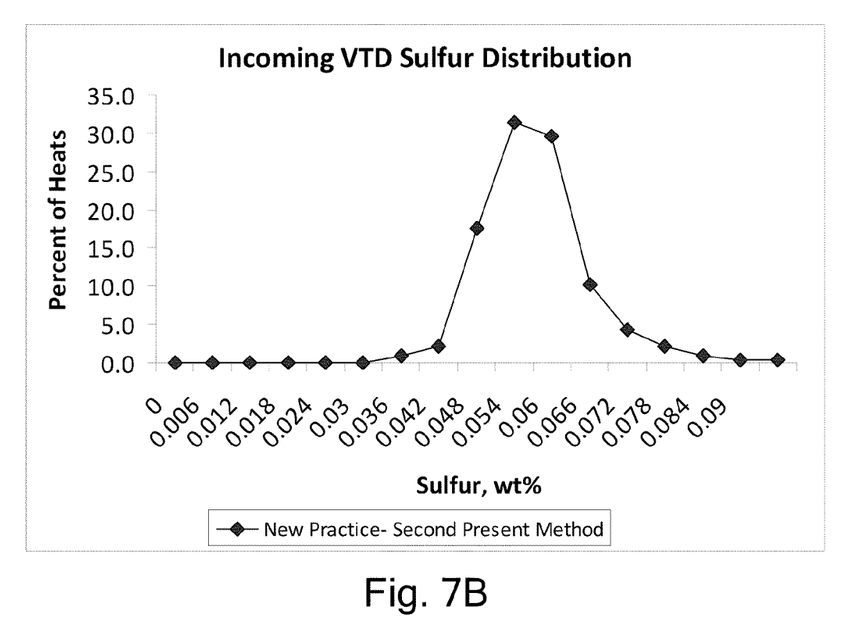
FIG. 7B is a graph of the sulfur content of heats entering the vacuum tank degasser using the prior process compared to the first present method.

The sulfur content of the steel composition when entering the VTD of the prior process is compared to the present method in FIGS. 7A and 7B. FIGS. 7A and 7B shows that the sulfur level of the steel composition when entering the VTD increased on average from 0.016% to 0.036% for the first present method and to 0.057% for the second present method. The sulfur distribution became more regular since no sulfur was removed to the slag after tapping. The present methods provide the tapping open step, not deoxidizing the steel composition after tap, and decarburize the steel composition at the VTD. Under these conditions, desulfurization at tapping is generally not possible since sulfur removal is driven by the following reaction:

$$[S]+(O^{2-})=(S^{2-})+[O] \quad (2)$$

where [S] and [O] represent the dissolved sulfur and oxygen content in the steel composition respectively, while ($O^{2-}$) and ($S^{2-}$) represent the oxygen and sulfur ions in the slag. Low dissolved oxygen contents in the steel composition and high concentrations of oxygen ions in the slag composition will drive reaction (1) to the right to desulfurize the steel composition. Deoxidation of steel composition results in low dissolved oxygen content assisting the desulfurization. However, the steel composition made by the present method is not deoxidized during tap so desulfurization does not begin. In addition, high slag basicities enable a high oxygen ion concentration in the slag composition, which is also not present in the present method because flux additions are not mixed into the steel composition. Hence, the sulfur level of the steel composition that enters the VTD with the present method is now more than twice as high compared to steel compositions made by the old process. TABLE 5 is a summary of the average tap carbon, sulfur, oxygen, and temperature values in the steel composition by the prior process and present method.

TABLE 5

Summary of selected tap variable averages

|  | Tap C % | Incoming VTD S % | Tap Oxygen, ppm | Tap temperature, ° C. |
|---|---|---|---|---|
| Prior Process | 0.022 | 0.016 | 1398 | 1708 |
| First Present Method | 0.035 | 0.036 | 962 | 1724 |
| Second Present Method | 0.049 | 0.051 | 695 | 1680 |

The slag composition and steel composition coming to the vacuum tank degasser of the three processes are quite different. Both present processes produce a low carbon, low sulfur steel product. A present Additions Model was developed to calculate the time required to decarburize the incoming steel composition down to 0.015% carbon. The decarburization time varies as a function of tap carbon; however the decarburization time may be between about 2 and 5 minutes. Also, the Additions Model calculates the amounts of aluminum, or ferrosilicon, and ferrosilicomanganese required to deoxidize the steel composition to a desired amount, such as less than 3 ppm oxygen, after the carbon is removed. The model also calculates the amount of lime and calcium aluminate that will combine with the resultant deoxidized steel and slag compositions for desulfurization. The Additions Model uses the incoming oxygen level measured at the VTD.

The average chemical compositions of the final VTD slags (old and new process) are summarized in TABLE 6.

TABLE 6

Average Final VTD Slag Compositions

|  | CaO | $CaF_2$ | $SiO_2$ | $Al_2O_3$ | MgO | FeO + MnO |
|---|---|---|---|---|---|---|
| Prior Process | 60.5 | — | 6.0 | 25.2 | 7.7 | 0.6 |
| First Present Method | 60.4 | — | 7.1 | 23.5 | 8.3 | 0.7 |
| Second Present Method | 60.5 | 10.7 | 19.2 | 5.3 | 3.6 | 0.8 |

TABLE 6 shows that the final slag compositions from the prior process and the first present method are remarkably similar. This indicates that the present steel sulfur levels in the steel composition made by the first present method should be consistent with those obtained via the old process route. The second present method has a different composition as it is used in a modified lime-fluorspar system instead of a modified calcium aluminate system. The sulfur distribution ($L_s$), defined as:

$$L_s = (\text{wt \% S})_{slag} / [\text{wt \% S}]_{steel} \quad (3)$$

can be calculated for both the old process and the present methods. The $L_s$ for the prior process was 2100, while for the first present method it was 1975 and the second present method it was 1360, as shown in TABLE 7 below. These are remarkably high values for the sulfur distribution, illustrating the effectiveness of the final slag compositions to remove and hold low sulfur levels in the steel composition. As disclosed in Sosinsky, D. J. and Sommerville, I. D., *The Composition and Temperature Dependence of the Sulfide Capacity of Metallurgical Slags*, Met. Trans. B, vol. 17B, 1986, pp. 331-337, the equilibrium sulfur distribution can be calculated where the oxygen potential of the slag-metal system is known or can be calculated from the deoxidation equilibrium. Equation (3) expresses the equilibrium sulfur distribution ratio in terms of temperature and the optical basicity of the slag.

$$\log L_s = (21920 - 54640\Lambda)/T + 43.6\Lambda - 23.9 - \log[a_O] \quad (4)$$

where $\Lambda$ is the optical basicity of the slag composition, T is temperature in Kelvin, and $a_O$ is the activity of oxygen in the steel composition. The calculated equilibrium sulfur distribution ratios are compared with the measured values in TABLE 7.

TABLE 7

Measured and Calculated Equilibrium Sulfur Distributions

|  | Measured $L_s$ | Calculated Equilibrium $L_s$ |
|---|---|---|
| Prior Process | 2100 | 2476 |
| First Present Method | 1975 | 2569 |
| Second Present Method | 1360 | 1572 |

TABLE 7 shows that the sulfur distributions for the old process and the present method are quite similar and that they both approach equilibrium as calculated. The ability to approach the calculated equilibrium value is indicative of the desirable slag/steel compositions mixing in a two porous plug equipped Vacuum Tank Degasser.

Figure 8A:
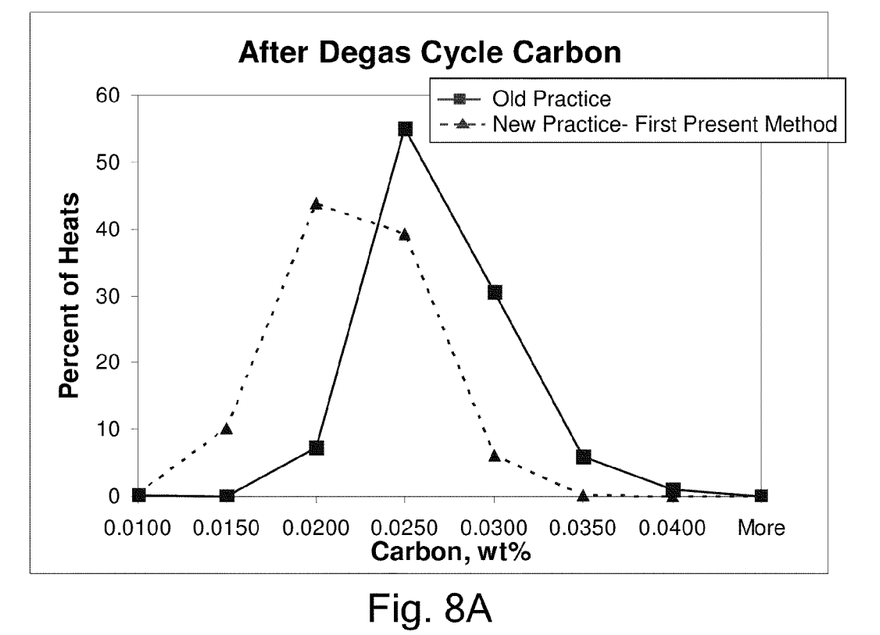
FIG. 8A is a graph of the distribution of carbon in the steel after a degassing cycle using the prior process compared to the first present method.
Figure 8B:
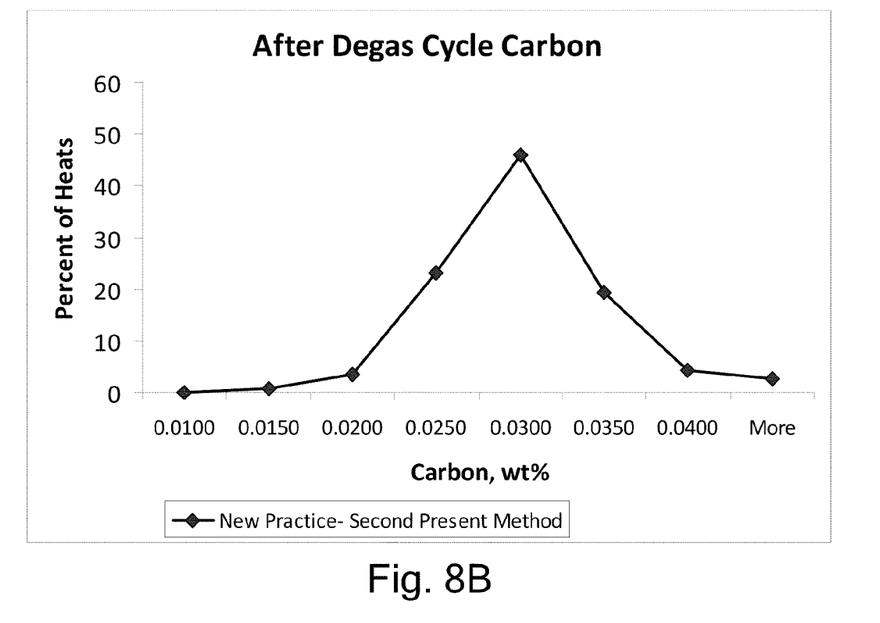
FIG. 8B is a graph of the distribution of carbon in the steel after a degassing cycle using the second present method.
Figure 9A:
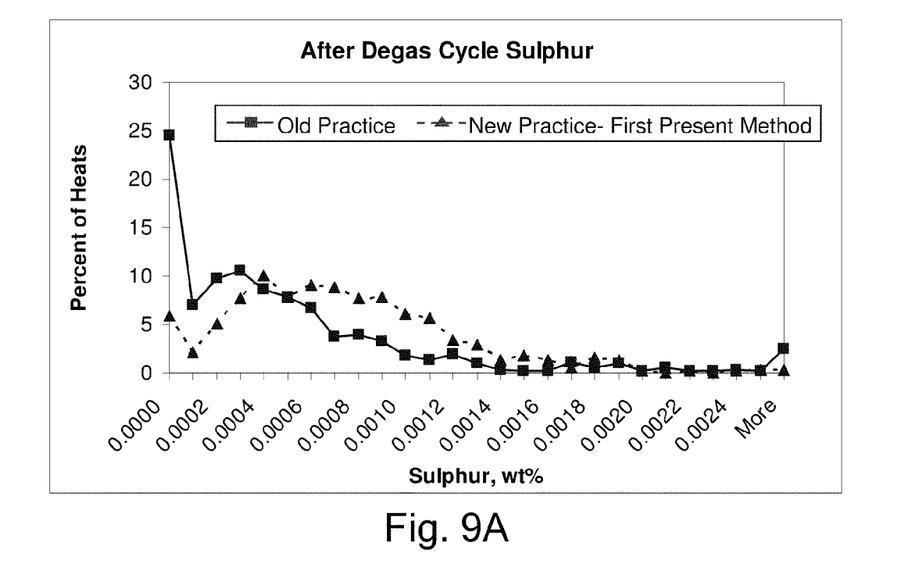
FIG. 9A is a graph of the distribution of sulfur in the steel after the degassing cycle using the prior process compared to the first present method.
Figure 9B:
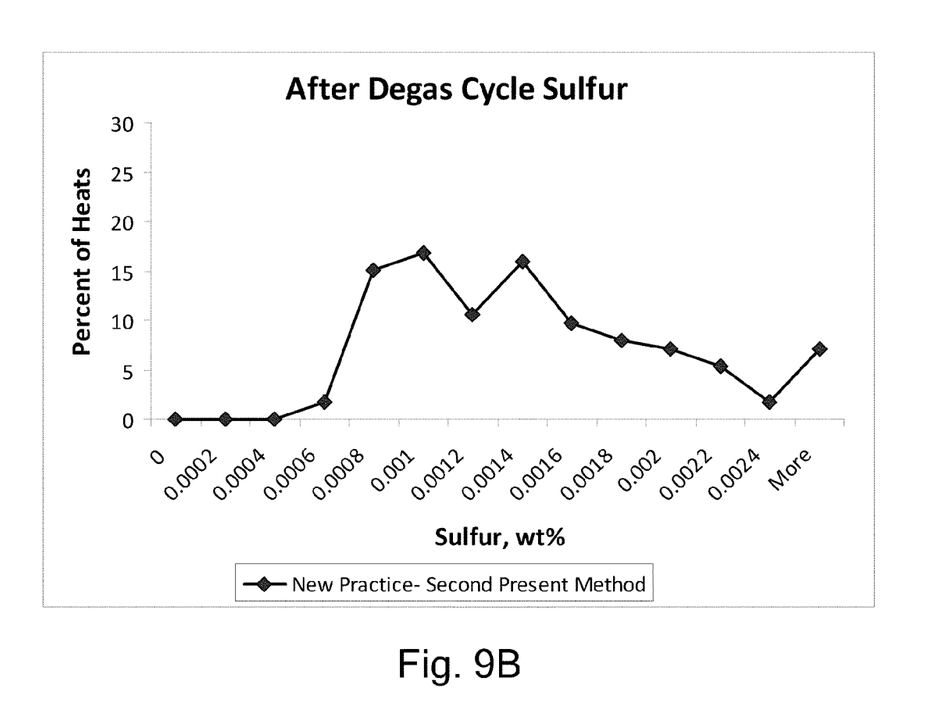
FIG. 9B is a graph of the distribution of sulfur in the steel after the degassing cycle using the second present method.

FIGS. 8 and 9 show the carbon and sulfur distributions after the degas cycle for the prior process and present method, respectively. From FIG. 8A it is evident that the carbon distribution changed and that the average carbon decreased from 0.0245% (prior process) to 0.0195% (first present method). The amount of carbon in the presently disclosed method is slightly higher than that calculated by the Additions Model. The present Additions Model calculates the amount of decarburization time required to produce a 0.015% carbon. As shown in FIG. 8B, the average carbon increased slightly in the second present method, to 0.030%. The final sulfur distribution did not change significantly as is shown in FIGS. 9A and 9B, although the average sulfur may be slightly higher for the second present method than the first present method.

The results show that low carbon and low sulfur steel compositions can be routinely produced using the presently disclosed method. By decarburizing at the VTD, the present method provides production of high quality low residual steel grades, and has significantly lowered both furnace refractory and alloy costs. Cost savings may be about $US 20 per ton. The trial production could extended for about eight months using this method.

While the invention has been illustrated and described in detail in the figures and foregoing description, the same is to be considered as illustrative and not restrictive in character, it being understood that only the preferred embodiments have been shown and described and that all changes and modifications that come within the spirit of the invention are desired to be protected.

What is claimed is:

1. A method of making a steel with low carbon less than 0.035% by weight comprising the steps of:
   (a) preparing a heat of molten steel composition in a steel-making furnace to a tapping temperature as desired for decarburizing at a vacuum tank degasser,
   (b) tapping open into a ladle the molten steel composition with an oxygen level between about 600 and 1120 ppm,
   (c) providing slag forming compound to the ladle to form a slag cover over the molten steel composition in the ladle,
   (d) transporting the molten steel composition in the ladle to a vacuum tank degasser,
   (e) decarburizing the molten steel composition at the vacuum tank degasser by drawing a vacuum of less than 650 millibars,
   (f) after decarburizing, transporting the molten steel composition in the ladle to a ladle metallurgical furnace,
   (g) prior to or after the step of transporting the molten steel composition in the ladle to a ladle metallurgical furnace, adding one or more deoxidizers to the molten steel composition,
   (h) prior to or after the step of transporting the molten steel composition in the ladle to a ladle metallurgical furnace, adding one or more flux compounds to desulfurize the molten steel composition,
   (i) deoxidizing the molten steel composition in the ladle metallurgical furnace,
   (j) after deoxidizing, transporting the molten steel composition in the ladle to the vacuum tank degasser,
   (k) desulfurizing the molten steel composition in the vacuum tank degasser, and
   (l) casting the molten steel composition to form a steel with low carbon less than 0.035% by weight.

2. The method of making a steel with low carbon less than 0.035% by weight as claimed in claim 1, prior to or after the step of transporting the molten steel composition in the ladle to a ladle metallurgical furnace, adding one or more ferroalloy compounds to the molten steel composition.

3. The method of making a steel with low carbon less than 0.035% by weight as claimed in claim 1, after the step of deoxidizing the molten steel composition, reheating the molten steel composition in the ladle.

4. The method of making a steel with low carbon less than 0.035% by weight as claimed in claim 1, where the amount of carbon in the steel composition during the tapping step is between about 0.02% and 0.05% by weight.

5. The method of making a steel with low carbon less than 0.035% by weight as claimed in claim 1, where the step of preparing a heat of molten steel composition is performed in an electric arc furnace.

6. The method of making a steel with low carbon less than 0.035% by weight as claimed in claim 1, where the decarburizing step is at a vacuum level of between 1 and 650 millibars.

7. The method of making a steel with low carbon less than 0.035% by weight as claimed in claim 1, where the decarburizing step is at a vacuum level of between 350 and 550 millibars.

8. The method of making a steel with low carbon less than 0.035% by weight as claimed in claim 1, further comprising the step of:
after desulfurization, drawing a vacuum between about 0.5 to 2.5 millibar for nitrogen removal.

9. The method of making a steel with low carbon less than 0.035% by weight as claimed in claim 1, where the step of adding one or more flux compounds comprises adding one or more compounds selected from a group consisting of lime, aluminum, calcium aluminate, dolomitic lime, wollastonite, fluorspar, silica sand, ferrosilicon, ferrosilicomanganese, and a prefused synthetic flux.

10. The method of making a steel with low carbon less than 0.035% by weight as claimed in claim 1, where the amount of sulfur in the steel composition during the tapping step is between about 0.02% and 0.09% by weight.

11. The method of making a steel with low carbon less than 0.035% by weight as claimed in claim 1, further comprising prior to decarburizing the step:
   (i) measuring and recording at the vacuum tank degasser the amount of carbon in the steel composition, amount of oxygen in the steel composition, and the temperature of the steel composition,
   (ii) providing a process model correlating amounts of oxygen and carbon in steel composition with decarburization time needed to reach a desired amount of carbon in the steel composition; and
   (iii) determining by the process model a decarburization time based on the measured amounts of oxygen and carbon in the steel composition.

12. The method of making a steel with low carbon less than 0.035% by weight as claimed in claim 1 further comprising prior to decarburizing the step:
   (i) measuring and recording at the vacuum tank degasser the amount of carbon in the steel composition, amount of oxygen in the steel composition, and the temperature of the steel composition,
   (ii) providing a process model correlating amounts of oxygen and carbon in steel composition with amounts of deoxidizing addition needed to deoxidize the steel composition and
   (iii) determining by the process model an amount of deoxidizing addition to the steel composition in the ladle metallurgical furnace based on the measured amounts of oxygen and carbon.

13. The method of making a steel with low carbon less than 0.035% by weight as claimed in claim 1 further comprising prior to decarburizing the step:
   (i) measuring and recording at the vacuum tank degasser the amount of carbon in the steel composition, amount of oxygen in the steel composition, and the temperature of the steel composition;
   (ii) providing a process model correlating amounts of oxygen and carbon in steel composition with amounts of flux elements needed to desulfurize the steel composition, capable of selecting one or more flux elements based on the price of the flux elements; and
   (iii) determining by the process model a selection of flux elements and their amounts for addition in the ladle metallurgical furnace based on the measured amounts of oxygen and carbon.

14. The method of making a steel with low carbon less than 0.035% by weight as claimed in claim 1, where the open tapping step is carried out at a temperature between about 1600° C. and 1650° C.

15. The method of making a steel with low carbon less than 0.035% by weight as claimed in claim 1, where the open tapping step is carried out at a temperature between about 1650° C. and 1700° C.

16. The method of making a steel with low carbon less than 0.035% by weight as claimed in claim 1, where the open tapping step is carried out at a temperature between about 1700° C. and 1750° C.

17. The method of making a steel with low carbon less than 0.035% by weight as claimed in claim 8 further comprising after nitrogen removal the steps:
   (i) transporting the molten steel composition in the ladle to the ladle metallurgical furnace, and
   (ii) adding free oxygen to the molten steel composition to a level between 20 and 70 ppm active oxygen and a total oxygen content of at least 70 ppm.

18. The method of making a steel with low carbon less than 0.035% by weight as claimed in claim 1 further comprising prior to casting the steps:
   (i) transporting the molten steel composition in the ladle to the ladle metallurgical furnace, and
   (ii) adding free oxygen to the molten steel composition to a level between 20 and 70 ppm active oxygen and a total oxygen content of at least 70 ppm.

\* \* \* \* \*

UNITED STATES PATENT AND TRADEMARK OFFICE
CERTIFICATE OF CORRECTION

PATENT NO. : 8,105,415 B2
APPLICATION NO. : 12/818619
DATED : January 31, 2012
INVENTOR(S) : Gary McQuillis et al.

Page 1 of 1

It is certified that error appears in the above-identified patent and that said Letters Patent is hereby corrected as shown below:

IN THE SPECIFICATION

Column 6, line 44, "stifling" should read --stirring--.
Column 6, line 51, "stifling" should read --stirring--.
Column 7, line 9, "stifling" should read --stirring--.
Column 7, line 56, "stifling" should read --stirring--.
Column 10, line 46, "stifling" should read --stirring--.

Signed and Sealed this
Fifteenth Day of May, 2012

David J. Kappos
*Director of the United States Patent and Trademark Office*